No. 680,597. Patented Aug. 13, 1901.
H. F. JOEL.
DYNAMO ELECTRIC MACHINE AND ELECTRIC MOTOR.
(Application filed May 21, 1901.)

(No Model.) 3 Sheets—Sheet 1.

WITNESSES:
Isabella Waldron

INVENTOR
Henry Francis Joel
BY
ATTORNEYS

No. 680,597. Patented Aug. 13, 1901.
H. F. JOEL.
DYNAMO ELECTRIC MACHINE AND ELECTRIC MOTOR.
(Application filed May 21, 1901.)

(No Model.) 3 Sheets—Sheet 2.

WITNESSES:
Isabella Waldron

INVENTOR
Henry Francis Joel
BY
Richards
ATTORNEYS

No. 680,597. Patented Aug. 13, 1901.
H. F. JOEL.
DYNAMO ELECTRIC MACHINE AND ELECTRIC MOTOR.
(Application filed May 21, 1901.)

(No Model.) 3 Sheets—Sheet 3.

WITNESSES:

INVENTOR
Henry Francis Joel
BY
ATTORNEYS

UNITED STATES PATENT OFFICE.

HENRY FRANCIS JOEL, OF LONDON, ENGLAND.

DYNAMO-ELECTRIC MACHINE AND ELECTRIC MOTOR.

SPECIFICATION forming part of Letters Patent No. 680,597, dated August 13, 1901.

Application filed May 21, 1901. Serial No. 61,231. (No model.)

*To all whom it may concern:*

Be it known that I, HENRY FRANCIS JOEL, a subject of the King of Great Britain and Ireland, residing at London, England, have invented a new and useful Improvement in Dynamo-Electric Machines and Electric Motors, (for which I have made application for Letters Patent in Great Britain, under No. 13,036, dated July 19, 1900,) of which the following is a specification.

My improvements relate to the winding and construction of the field-magnets of dynamo-electric machines and electric motors, whereby two, four, or any equal number of poles can be magnetized alternately by one specially-shaped coil, such winding combining the electrical efficiency of individual and independent pole-windings and the economy in copper and weight and cheapness of construction of an all-round single ring-winding, while affording special advantages not common to either of above systems—viz., a considerable saving in the outer diameter, width, and thickness of the iron magnetic circuit and casing, thus reducing the weight, more equal distribution of the magnetization of the poles, with less loss by eddy-currents, and also suppressing the sparking at brushes by inducing a magnetic fringe at the leading and trailing poles.

In order that my invention may be the better understood, I now proceed to describe the same with reference to the accompanying drawings and to the letters marked thereon, like letters indicating like parts.

Figure 1:
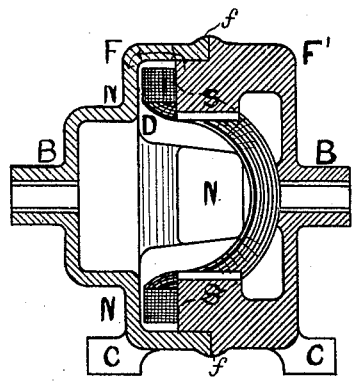
Figure 2:
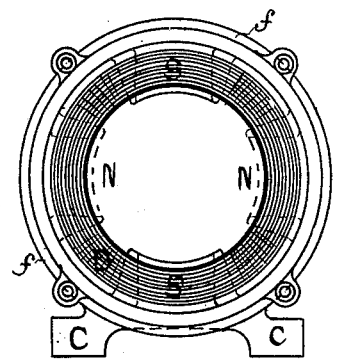
Figures 7, 8:
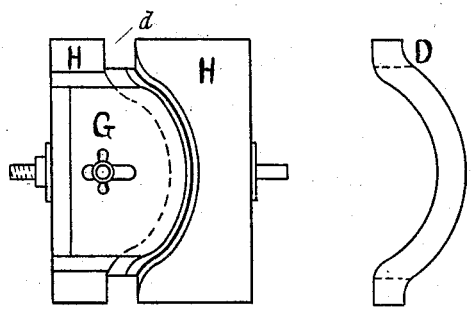
Figure 9:
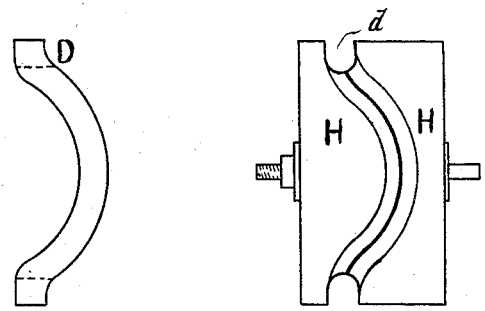
Figure 10:
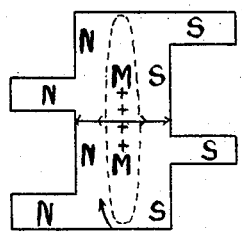
Figure 11:
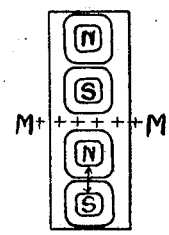
Figure 12:
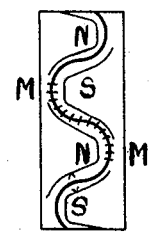
Figure 3:
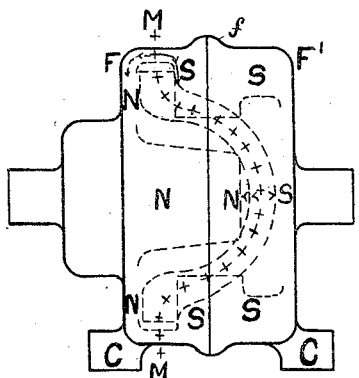
Figures 4, 5:
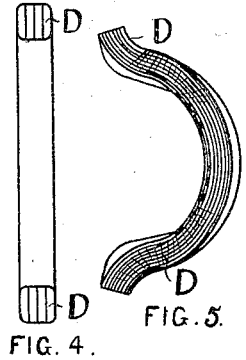
Figure 6:
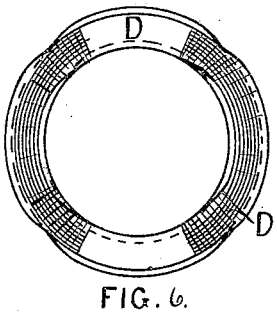
Figure 18:
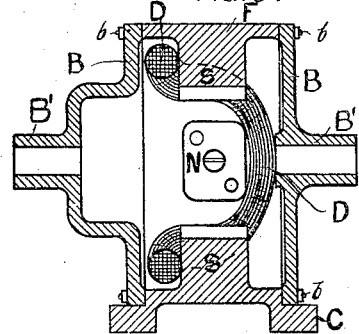
Figure 16:
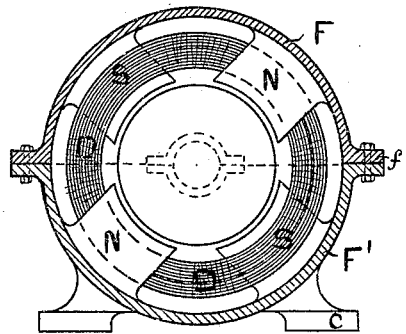
Figure 13:
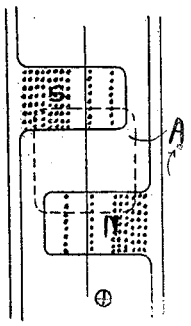
Figure 14:
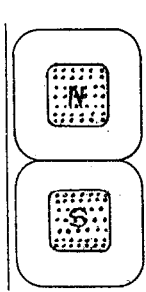
Figure 15:
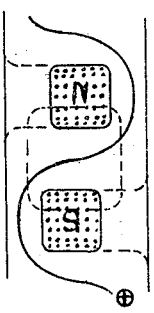
Figure 17:
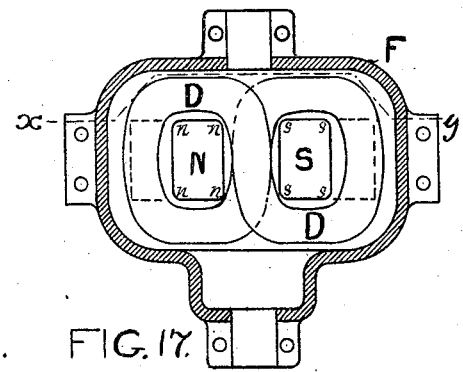
Figure 19:
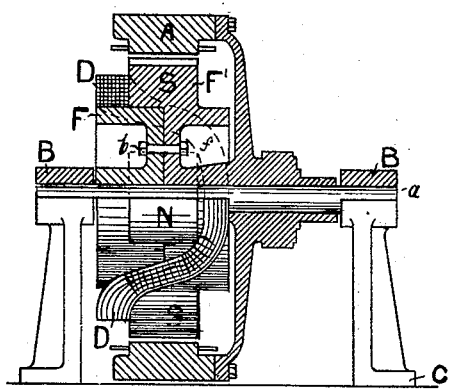
Figure 20:
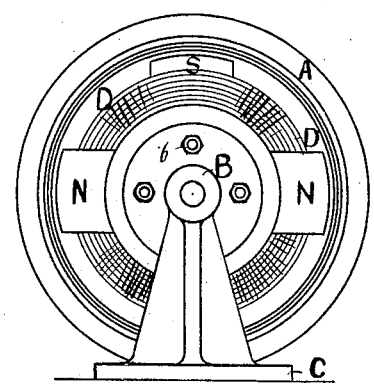

Figure 1 is a longitudinal section with armature removed, and Fig. 2 is an elevation, with front part removed, of a four-pole continuous dynamo or motor; and Fig. 3 is an outside diagrammatic side elevation of the same. Fig. 4 is a detached detail of the ring-pole winding for same before molding, and Figs. 5 and 6 are front and side views of the same after molding. Fig. 7 is an outside view of a "former" for winding and molding a sectional square ring-coil, and Fig. 8 is a square ring-coil so molded. Fig. 9 is an outside view of a former for winding and molding a sectional round ring-coil. Figs. 10, 11, and 12 are comparative diagrammatic representations of the magnetic path and neutral lines of poles. Figs. 13, 14, and 15 are corresponding comparative diagrammatic representations of the distribution of the magnetic lines on such poles. Figs. 16 and 17 are a transverse section on line $x\,y$ and plan, with top case removed, of modified arrangement of poles relatively to sinuous ring-coil. Fig. 18 is a longitudinal section, with armature removed, of a dynamo or motor of a simple form of construction of poles and ring-winding. Figs. 19 and 20 are a half-longitudinal section and end elevation of a modified, but equivalent form of dynamo or motor.

The dynamo which is shown as one type, by way of example, in Figs. 1, 2, and 3, is of an annular shape, made in two halves F F', of cast-iron, steel, or of wrought-iron, joined at $f$ by bolts and nuts, each half carrying the bearings B for the armature of any convenient construction and having supporting-feet at C. There are four field-magnet poles N S N S, projecting directly from the inner surface of the flanged drum or outer framing of the dynamo radially toward the center, one half, F, has two projecting poles N N and two spaces or recesses and the other half, F', two similar poles S S and spaces. The poles of each half partly project beyond the central joint $f$ in the drum, as shown in Fig. 1 at S S, and go into the spaces between the poles of the other half and fit close under the inside of the outer frame or drum of the other half, to which it is bolted. The poles, as shown in Fig. 3 dotted at N, are made somewhat cone-shaped, but with the top blunt in order to obtain the necessary surface. This cone shape facilitates the entering into the recess of the other half and has other advantages enumerated hereinafter.

I make one magnetizing field-coil D to magnetize the four poles alternately, N and S of a special sinuous shape to correspond in contour as to projections and recesses with the field-poles, but exactly opposite or complementary in shape to the poles, so that the coil has recesses into which the pairs of projecting poles fit, and itself fills or partly fills the spaces between the poles, and the coil, where there are four poles, has its successive waves and curves in planes perpendicular to one another and tangential to the ring-coil as a whole.

The coil D may be made into the sinuous shape by compression between blocks shaped to correspond to the projections and recesses or by being molded on suitable blocks or upon the actual poles themselves. In this case it is first wound as a simple ring, as shown in Fig. 4, and then pressed or molded into the shape shown in Figs. 5 and 6. To assist the process, the necessary thickness or number of turns may be more easily made up in sections or separated coils, as indicated by the cross-lines in Fig. 4. Each section is pressed in turn and afterward placed together and joined to form one complete coil, assuming in the process the peculiar shape shown in Figs. 5 and 6.

To complete the field-magnets, the two halves F F' of the dynamo are separated, the coil D is placed in position between them, and the two halves F F' are then rejoined and bolted together, thus inclosing the coil D in its place and completing the field-magnets, the coil-winding passing between and partly around each of the polar extensions in succession. When an electric current is passed through the coil, the poles of the field-magnets N S N S are magnetized alternately north and south, as desired.

As an alternative to the method of pressing or molding the coil D into shape, as previously described in reference to Figs. 4, 5, and 6, I may wind it directly on a special former H H, (shown at Figs. 7 and 9,) made in two halves, so that the coil may be removed after it has been wound in the wire spaces $d$ $d$. Fig. 7 shows a former for winding a square section-coil with four adjustable guides arranged equally around the former H H, of which one only is shown at G, holding the first turn in its place. These guides are used two at a time on opposite sides of the former to hold the turns of wire on the projecting edge and are moved back for each successive turn until the layer is completed, when the two other guides are then required for the return layer, and so on until the coil is completed, as shown in Fig. 8, or other retaining means may be used. For winding the circular section-coil a similar former is used. (Shown at Fig. 9.) In this former the circumferential sinuous winding groove or space $d$ is round at the bottom, and the first turn shown on the figure when skilfully wound can be made to follow the shape of the mold or former and to lie at the bottom of the curved space, and each succeeding turn can then be arranged to keep in its place.

I may use any known or usual type of armature with iron core in connection with these field-poles, which armature is not therefore shown or particularly described.

In order to more clearly show the action of this dynamo and my novel disposition of the field-poles, in combination with the specially-shaped sinuous coil, I have made comparative diagrams at Figs. 10, 11, and 12 and corresponding diagrams at Figs. 13, 14, and 15.

Fig. 10 shows a well-known type of field-magnet core and winding, in which the poles are extensions from the ends of the cylindrical or annular core with a single coil inside, the polar extensions being turned down and under the coil, so as to come close to the armature. In this arrangement the zone of neutral magnetism encircles the ring in the center, the part of the zone apportioned to the pairs of poles being shown by the star-marked line from M to M and the line joining the poles by the arrows. Fig. 11 also shows a well-known method of making multipolar dynamos and motors with evenly-disposed radial poles each having separate coil-windings. In this case the zone of neutral magnetism, also shown by the star-marked line M to M, is at right angles to the ring and to that of Fig. 10. In my arrangement of the poles and coil (shown in the diagram Fig. 12) the poles project radially from the outer frame or ring and take the direct and shortest path to the armature. In this figure the neutral zone is shown by the sine-curve-shaped star-line from M to M, and as the area of the metal between the poles is required to be the same as the poles it follows that the length of the sinuous line being greater than the straight line shown on Figs. 10 to 11 therefore the section of the metal may be less in proportion, the length multiplied by the section giving the required area, and there is less waste and useless metal around the annular ring in proportion to the extended length over which the lines of force are distributed. This of course only applies to the outer frame; but there is a considerable saving in the total weight of iron in comparison with the arrangement shown in Fig. 10 and also a small saving in the copper coil, owing to the fact that the projecting poles in Fig. 10 have to pass under the field-coil, between it and the armature, and the total diameter of the whole motor and the field-coil is thereby increased, whereas my coil comes directly over the armature, or approximately so, as in Fig. 1, and is of smaller diameter. In comparison with the type shown in Fig. 11 there is also a saving of my core in the outer iron casing and a considerable saving in the weight of the copper-wire coils, as my coil only passes around a partial periphery of the poles, and there is the additional advantage that I have more room for the single coil and turns of wire, though the magnetic efficiency of my pole-winding remains as great as in the latter system.

Another advantage I claim is that the path between the poles in comparison to the path shown in Fig. 10 by the arrow-lines is shortened, inasmuch as the polar extensions in Fig. 10 have to be shaped to go under the magnetizing-coil inside the ring to come close to the armature, and a long extension is necessary, and as the coil in this type passes at right angles to each pole as it projects from the side the magnetic lines are unequally distributed over the poles, being greater in number at the base and less at the tips, as shown by the dotted shaded lines in Fig. 13, this distortion being increased by the magnetic reaction of the armature. In my method the coil passes between successive pairs of poles, (see Fig. 15,) and the magnetic lines take the direct and much shorter path indicated by the arrows shown on the section Fig. 1 and side view, Fig. 3, at the top left corner, and I effect the more even distribution of magnetism, (shown by the shaded dotted lines in Fig. 15,) the lines increasing and diminishing parallel to the armature-wires and at right angles to the core-plates, making my dynamo or motor practically free from eddy-currents, whereas in the type shown in diagram at Figs. 10 and 13 the reverse is the case. I also get far less armature reaction, due to the extra magnetic fringe induced under the leading and trailing pole-tips, with an almost entire suppression of sparking and heating at the brushes and less wear and tear at the commutator, with the advantage of having a fixed position for the brushes with either way of rotation and at considerable variations of speed and load. This is more particularly shown in Fig. 15, which is a diagram showing sine-shaped magnet-poles with a single magnetizing-coil made as previously described. The sine-shaped magnet-poles have the advantage that the iron core of the armature gradually leaves each pole and as gradually approaches the succeeding and opposite pole at its extreme base and comes into the magnetic field of that opposite pole just after leaving the pole it has been moving under. This also assists to prevent reaction or disturbance at the armature and sparking at the brushes, as well as the existence of the positive magnetic fringe at the edges or tips of the poles, (shown by the dotted shaded lines in Fig. 15,) which is the shortest path across the neutral line following the center of the field-coils. Another point is that the field-coil is wound to follow or to trend in the same direction as the armature-winding instead of being at right angles to it, as is the case with the all-round single field-coils. This has the advantage that it does not tend to magnetize the armature-core in a sense opposed to that of of the polarizing action of the field-magnets, as would be the case of a dynamo or motor described in reference to the diagram Fig. 10 and shown at N S, Fig. 13, with the consequent disturbance of the armature and sparking and heating due to such disturbance. My field-coil winding rather assists to magnetize the armature with the same polarity as is induced by the field-poles and prevents disturbance and sparking.

As alternative but equivalent methods of construction I may construct the field-magnet cores, as in Figs. 16 and 17, with halves F F', each duplicate to one another, with two or more poles N S and recesses, the halves being made to join at $f$, parallel to the axle of the armature, in place of being halved at right angles to the axle, as before described.

The special-shaped field-coil D, Fig. 17, is similar to but shown from a different point of view to that in Figs. 5 and 6 and when looked at from above appears so as to form an 8-shaped figure, with the crossing portions separated from one another by the full diameter of the internal armature, the successive waves or curves being alternately in planes perpendicular to one another. The coil is first placed in position on the lower half F'. The armature is then passed through the coil onto its bearings, and the upper half F is placed in position and bolted to the lower half to complete the dynamo.

My magnet-coil winding can be applied to any of the usual types of four-pole or multiple-pole dynamos or motors.

I make a simple form of dynamo or motor with my special-shaped sinuous ring-coil by making the outer frame or ring F (shown in Fig. 18) with, say, two poles S S, all in one casting and having the other pole extensions N N bolted or separable from the outer ring or frame, as shown at center pole N, and then place the specially-shaped coil D in position before the poles N N are affixed. Upon bolting the poles N N into position on the external case F the sinuous coil D is also fixed in position to the said poles, as hereinbefore described. In this construction both bearing ends B of the frame F are made detachable and fixed by the bolts $b$.

It is obvious that the relative positions of field and armature may be reversed, so that the latter is situated externally to the former, and this I show in Figs. 19 and 20, where F and F' are the divided magnetizable circuit or core for the field-poles N N S S, of which N N are integral with F and S S with F', and when united as shown project into the convolutions of the sinuous and previously-molded coil D, as hereinabove described. In this case the armature A is mounted revoluble on the axle $a$, fixed in the bearings B, the magnet-cores F F' being also fixed to the axle.

The mechanical and magnetic advantages of my foregoing-described construction of dynamo or motor as compared with the before-mentioned all-round ring-winding are— first, saving of weight of iron and smaller outside diameter, width, and thickness of the field-magnet frame; second, some saving of weight of copper by lessened diameter of coil; third, shorter magnetic path and less leakage as less surface is exposed; fourth, far less eddy-currents; fifth, far less armature reactions; sixth, almost entire suppression of sparking and heating at the brushes and less wear and tear at the commutator; seventh, a fixed position for the brushes for either way of rotation and at any speed and as compared with multiple-pole separate core-windings; eighth, simplicity of construction, one coil serving for any number of poles;

ninth, large saving of weight of copper; tenth, large saving of weight of iron from reduction of width for given power or output; eleventh, lessened resistance from the single coil of same magnetic efficiency as separate multiple windings, thus effecting a better efficiency and a fixed position for the brushes for either way of rotation or at any speed or load.

Having now described my invention, what I claim, and desire to secure by Letters Patent, is—

1. In a dynamo machine or motor a magnetizable and divisible field circuit or core, carrying radiating field-poles, in combination with a previously-molded single and sinuous ring-coil, adapted to receive said poles when poles and frame are united, and to pass between and partially embrace in succession by alternating curves in planes tangential to the ring-coil, a considerable periphery of said poles, to magnetize said poles with successively equal and opposite polarities on alternate sides of said sinuous coil.

2. In combination in a dynamo machine or motor, a divided external magnetizable circuit or case adapted to support and inclose an internal armature field-poles radiating from said external case to central axis; and a previously-molded and sinuous ring-coil, partially embracing by alternating curves in a plane tangential to the ring-coil, a considerable periphery of the said poles, radiating through said ring-coil, in order to magnetize said poles with successively equal and opposite polarites on alternate sides of said sinuous coil.

3. In combination in a dynamo machine or motor an external magnetizable circuit or case divided in the plane of rotation of an internally-supported and inclosed armature, each half of said case carrying a moiety of radial poles, adapted to interspace and overlap when the parted case is closed and a single and sinuous ring-coil previously molded so as to receive into its sinuous curves, and to partially embrace in a plane tangential to the ring-coil, the said poles when the said parted case is closed.

4. In a dynamo machine or motor a four-pole single continuous and sinuous field ring-coil, having successive waves or curves, alternately in planes perpendicular to one another and tangential to the ring-coil in combination with radial field-poles situated in the plane of rotation of the armature.

In witness whereof I have hereunto set my hand in presence of two witnesses.

HENRY FRANCIS JOEL.

Witnesses:
RICHARD A. HOFFMANN,
CHARLES CARTER.